C. E. STARR.
VEHICLE DRIVING GEAR.
APPLICATION FILED OCT. 15, 1917.

1,323,795.

Patented Dec. 2, 1919.
2 SHEETS—SHEET 1.

INVENTOR
CHARLES E. STARR
BY
Horace Barnes
ATTORNEY

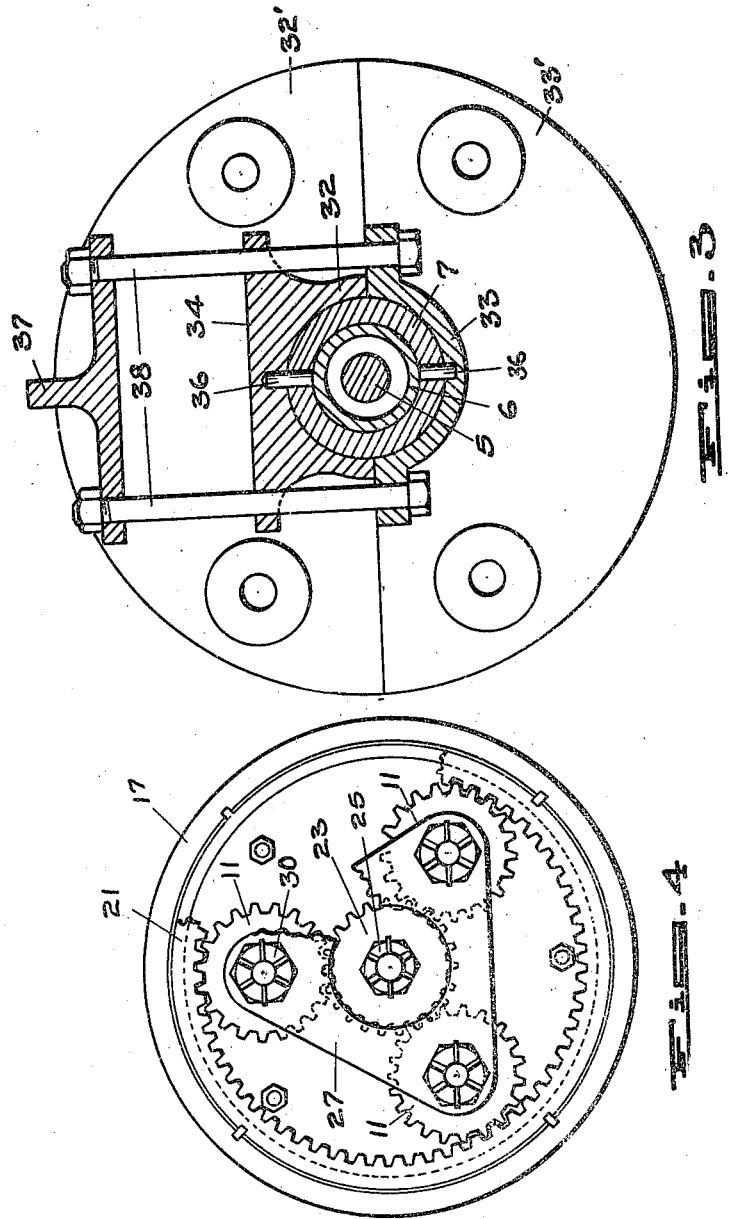

UNITED STATES PATENT OFFICE.

CHARLES E. STARR, OF SEDRO WOOLLEY, WASHINGTON, ASSIGNOR TO SEATTLE PATENT HOLDING CORPORATION, OF SEATTLE, WASHINGTON, A CORPORATION OF WASHINGTON.

VEHICLE DRIVING-GEAR.

1,323,795.

Specification of Letters Patent. Patented Dec. 2, 1919.

Application filed October 15, 1917. Serial No. 196,757.

*To all whom it may concern:*

Be it known that I, CHARLES E. STARR, a citizen of the United States, and resident of Sedro Woolley, county of Skagit, and State of Washington, (whose post-office address is Sedro Woolley, Washington,) have invented a new and useful Improvement in Vehicle Driving-Gears of which the following is a specification.

This invention relates to improvements in mechanism for communicating power to the driving wheels of motor vehicles and to improvements in devices for supporting the weight of the body of such vehicles upon the wheels thereof.

The object of the invention is to provide a strong and durable hub structure for the rear wheels of a motor vehicle that embodies speed reduction gearing located on the outside of the wheel hub and adapted to be directly connected with the differential axle of the vehicle and also embodies suitable truss means whereby the greater portion of the weight of the vehicle body is supported by the hub structure from a point as near as possible to the center of the wheel.

A further object is to form the hub structure so as to admit of the use of a full floating axle.

The power transmission and body supporting structures herein disclosed are designed especially for use in converting ordinary automobiles or pleasure cars into trucks or tractors.

By the use of this device the drive chains and jack shaft commonly used on rebuilt trucks and tractors are done away with and a completely housed gear drive that is connected directly with the differential axle is substituted in place thereof.

Another advantageous feature of this device resides in the mounting of the gearing on the outside of the wheel hub, thus leaving the inner side of the hub free to have the brake drum mounted thereon in the usual manner.

The invention consists in the noval construction of a reduction gear for the drive wheels of a motor vehicle and in the adaptation and combination therewith of hub mechanism for the wheels and truss means having a bearing near the center of the wheels for supporting the weight of the vehicle body, as will be more clearly hereinafter described and claimed.

Figure 1:
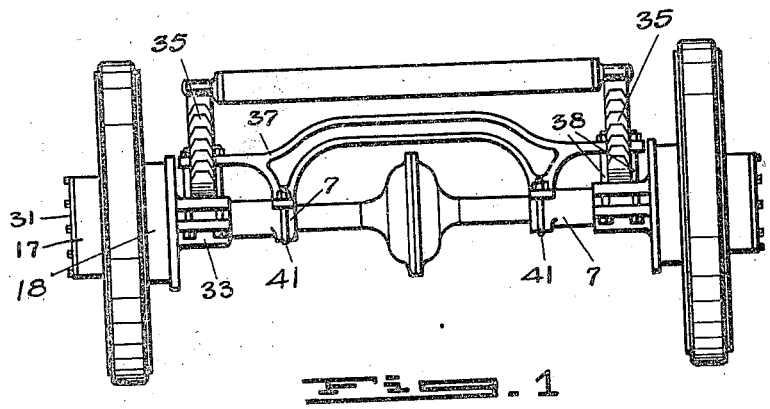
Figure 2:
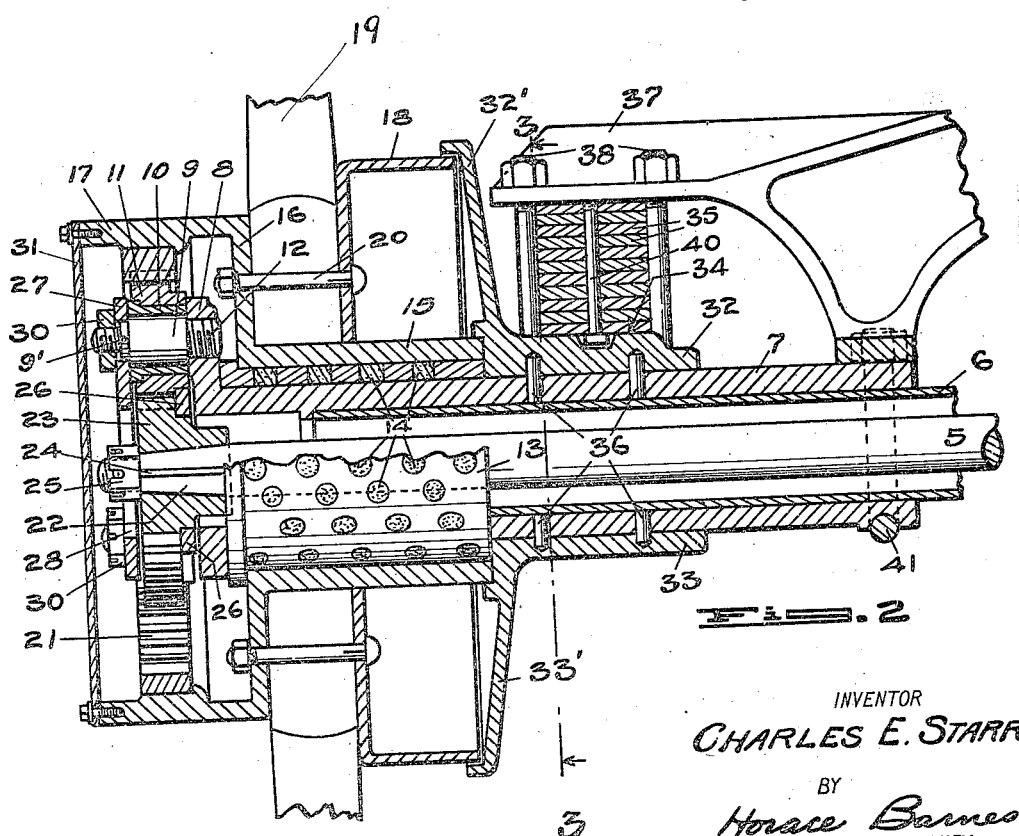

In the accompanying drawings, Figure 1 is a somewhat diagrammatic view in rear elevation of a vehicle upon which this invention is installed; Fig. 2 is a view in vertical section of a wheel hub and associated parts that are constructed in accordance with this invention, certain parts being shown in elevation; Fig. 3 is a view in cross section substantially on broken line 3—3 of Fig. 2; and Fig. 4 is a view in elevation of the gear mechanism as it may appear when the cover plate of the gear housing is removed, certain parts being broken away to better reveal the construction of certain other parts.

Referring to the drawings throughout which like reference numerals indicate like parts, the numeral 5 indicates the differential axle of a motor vehicle and 6 indicates a non-rotatable axle housing of well known form within which the axle 5 is disposed.

The hub mechanism comprising this invention consists of a sleeve 7 that is adapted to fit over the housing 6 and is formed on its outer end with a triangularly shaped flange 8 to which are secured three equidistant bearing pins 9 that carry bushings 10 upon which are mounted pinions 11. The bearing pins 9 may be screwed into the flange 8 as indicated at 12.

13 is an annular bushing having Babbitt metal inserts 14 and disposed upon the sleeve adjacent the flange 8 to form a bearing for the annular member 15 that constitutes the inner portion of the wheel hub.

The member 15 is flanged as at 16 and terminates in an outwardly extending annular element 17 that forms a housing for the gears.

18 is a brake drum located on the inner side of the wheel in such a manner that the spokes 19 of the wheel may be inserted between the brake drum and the flange portion 16 and the two tightly secured together by bolts 20 to form a rigid wheel structure.

Within the gear housing 17 and fixedly secured thereto, is disposed an internally toothed gear 21, that meshes with the pinions 11. The axle 5 is of the full floating type and is provided on its outer end with a tapered portion 22 upon which is disposed a gear wheel 23 that is secured to the shaft so that it will rotate therewith by means of a key 24 and a nut 25. The gear wheel 23 is provided with a bearing washer 26 on its inner surface and is adapted to mesh with 110 the pinions 11 so that when the shaft 5 is rotated the pinions 11 will be driven and will act upon the internal gear 21 to turn the wheel.

27 is a triangular plate having a central recess 28, to accommodate the end of the axle 5 and provided at three points with suitable holes that fit over the bearing pins 9 so that when nuts 30 are screwed tightly onto the ends of the bearing pins 9 the plate 27 will be forced against shoulders 9' on the pins 9 and the outer ends of the three bearing pins will be rigidly secured in spaced relation, the plate 27 thus coacting with the triangular flange 8 to form a rigid cage for the pinions 11.

The outer end of the gear housing 17 may be closed by a suitable cap 31 and the housing may be filled with grease or oil so that the gear will always be thoroughly lubricated when in use.

Mounted upon the sleeve 7 just inside of the brake drum 18 is a two part spring support that consists of an upper section 32 and a lower section 33. The two parts 32 and 33 are provided with flanges 32' and 33', respectively, that form a cover or closure for the end of the brake drum 18 and the upper part 32 is provided with a suitable flat bearing surface or spring saddle 34 upon which a spring 35 is adapted to rest. The members 32 and 33 are secured to the sleeve to prevent respective turning movement by dowel pins 36.

37 is a truss bolster that rests upon and is secured to the spring 35 and forms a rigid arch connection between the hub members on opposite sides of the vehicle. The truss 37, spring 35 and the two parts 32 and 33 of the spring support are all connected together by bolts 38 that pass through suitable holes in the truss member 37 and through suitable holes in outwardly turned flanges on the two parts 32 and 33 of the spring support, as more clearly shown in Fig. 2.

The leaves of the spring 35 may be further secured together by a bolt 40, the head and nut of which are disposed in suitable recesses in the member 32 and truss 37, as more clearly shown in Fig. 2.

Aside from its bearing upon the spring 35 the truss member 37 is rigidly connected by a U bolt 41 with the extreme inner end of the sleeve 7, thus forming a rigid arched structure between the sleeves 7 on opposite ends of the axle housing that securely ties the two driving wheels together and prevents undue strain on the axle housing 6.

In Fig. 1 I have illustrated the two rear wheels of a motor vehicle for the purpose of showing the truss mechanism for connecting the two together, and relieving the axle housing of the greater part of the load. The hub mechanism of the two wheels is however identical so that only one of the same has been shown and described in detail.

The gearing in the device herein disclosed is disposed within a dust proof housing that may be filled with oil or grease so that the gearing will always be kept thoroughly lubricated and will run with a minimum amount of friction and wear.

The hub structure admits of the use of a full floating axle and the mechanism for supporting the weight of the vehicle body and is so constructed and arranged that the great portion of the weight is carried by the sleeve 7, and the axle housing is relieved of undue strain.

When the wheel is to be removed the spring 35 and truss bolster 37 will be disconnected from the sleeve 7 and member 32 thus permitting the sleeve 7 to be slipped off of the housing 6 and the various parts to be disassembled.

It is obvious that by varying the relative sizes of the several gears and pinions the gear ratio may be varied to suit the requirements for installation on different types of cars.

Manifestly changes in the form of construction of the details of this device may be resorted to within the scope of the following claims.

What I claim and desire to protect by Letters Patent is—

1. The combination with a floating differential axle, and an axle housing therefor, of a gearwheel secured on the end of said axle, a sleeve disposed to fit over and be secured to said housing, a flange on the end of said sleeve, a plurality of bearing pins in said flange, gearwheels mounted on said bearing pins, a plate rigidly connecting the outer ends of all of said bearing pins, a wheel having a hub that fits over said sleeve, a bearing member interposed between said sleeve and said hub, a gear housing secured to the outer end of said hub, an internal gear fixedly disposed within said housing and meshing with said pinions whereby rotation of said axle will turn said wheel, a two part spring support mounted on said sleeve, a spring saddle on the upper part of said support adjacent the hub of said wheel, a truss member connected with said support adjacent said saddle and means connecting said truss with the inner end of said sleeve.

2. The combination with a rotary axle and fixed housing surrounding the same, of a sleeve disposed to fit over the end of said housing and secured thereto, a driving wheel having a hub journaled upon said sleeve, the sleeve extending through the hub, speed reduction gears interposed between said wheel hub and said axle and located on the outer side of said hub, a brake drum located on the inner side of said hub, and means on said sleeve adjacent said brake drum for supporting a spring whereby the load will be supported from a point adjacent the center of the wheel.

3. The combination with the rear axle and axle housing of an automobile, of wheels provided with hub structures that comprise sleeves adapted to slip over the opposite ends of said axle housing, spring supports carried by said sleeves adjacent said wheels, springs secured to said spring supports and a separable truss above said axle and rigidly connecting with the said spring supports on the two opposite wheels, said truss also being rigidly connected with the inner ends of said sleeves.

4. The combination with the differential axle and axle housing of a motor vehicle, of wheels having hubs provided with sleeves that fit over the opposite ends of said housing, gear means in said wheel hubs and connected with said differential axle for rotating said wheels at reduced speed in response to rotation of said axle, spring supports carried by said sleeves, a truss member having one end fixedly secured to each of said spring supports at a point adjacent said wheel and forming a rigid supporting structure extending across said vehicle and devices connecting the inner ends of said sleeves with said truss.

5. The combination with the differential axle and axle housing of a motor vehicle, of sleeves that fit over and are secured to the opposite ends of the housing, wheels rotatably mounted on the sleeves, reduction gearing disposed on the outside of the wheels and connecting the wheels with the axle, two part spring supports disposed to fit over said sleeves on the inside of said wheels, pins connecting said sleeves and said spring supports, springs carried by said spring supports, a truss having one end secured to each of said spring supports and means connecting the inner ends of said sleeves with said truss whereby a rigid support extending crosswise of the car will be formed to relieve the axle housing from strain.

Signed at Sedro Woolley, Washington, this 29th day of Sept., 1917.

CHARLES E. STARR.